United States Patent [19]

Rubio

[11] Patent Number: 4,513,018

[45] Date of Patent: Apr. 23, 1985

[54] CONTINUOUS PRODUCTION OF CORN PRODUCTS

[76] Inventor: Manuel J. Rubio, 192 Benham Ave., Bridgeport, Conn. 06605

[21] Appl. No.: 519,866

[22] Filed: Aug. 3, 1983

Related U.S. Application Data

[60] Continuation of Ser. No. 332,307, Dec. 18, 1981, abandoned, which is a division of Ser. No. 22,788, Mar. 22, 1979, Pat. No. 4,326,455.

[51] Int. Cl.³ .......... A23L 1/10

[52] U.S. Cl. .......... 426/622; 426/626; 426/463; 34/57 R; 34/57 E; 241/6; 241/186 R; 241/189 R

[58] Field of Search .......... 426/622, 626, 463, 459, 426/464, 467, 465; 34/57 R, 57 E; 241/8, 12, 9, 27, 60, 23, 6, 186 R, 189 R

[56] References Cited

U.S. PATENT DOCUMENTS

| | | | |
|---|---|---|---|
| Re. 26,263 | 9/1967 | Madrazo et al. | 426/626 |
| 729,008 | 5/1903 | Sutton et al. | 34/57 E |
| 826,983 | 7/1906 | Wreford et al. | 426/626 |
| 993,819 | 5/1911 | Bunn | 426/622 |
| 1,268,860 | 6/1918 | de Lara | 426/626 |
| 1,444,528 | 2/1923 | Schreiber | 426/622 |
| 1,759,905 | 5/1930 | Keith | 241/186 R |
| 1,883,218 | 10/1932 | Wohlenberg | 34/57 R |
| 2,100,691 | 11/1937 | Foster | 241/12 |
| 2,236,006 | 3/1941 | Mulvany | 34/57 R |
| 2,358,827 | 9/1944 | Rakowsky et al. | 426/622 |
| 2,584,893 | 2/1952 | Lloyd | 426/622 |
| 2,704,257 | 3/1955 | de Sollano et al. | 426/626 |
| 2,880,093 | 3/1959 | Kuhlmann et al. | 426/463 |
| 2,930,699 | 3/1960 | de Sollano et al. | 426/622 |
| 3,133,818 | 5/1964 | Gould et al. | 426/463 |
| 3,159,493 | 12/1964 | Japikse et al. | 426/463 |
| 3,172,766 | 3/1965 | Larebeyrette | 426/622 |
| 3,194,664 | 7/1965 | Eytinge | 426/626 |
| 3,333,777 | 8/1967 | Highfill et al. | 241/189 R |
| 3,354,555 | 11/1967 | Barr | 34/57 R |
| 3,360,870 | 1/1968 | Stephanoff | 34/57 R |
| 3,369,908 | 2/1968 | Gonzalez et al. | 426/622 |
| 3,397,067 | 8/1968 | Galle | 426/622 |
| 3,859,452 | 1/1975 | Mendoza | 426/622 |
| 4,010,551 | 3/1977 | Rohde | 34/57 R |

FOREIGN PATENT DOCUMENTS

| | | | |
|---|---|---|---|
| 727212 | 3/1955 | United Kingdom | 241/186 R |
| 495085 | 4/1976 | U.S.S.R. | 241/186 R |

*Primary Examiner*—Steven Weinstein

*Attorney, Agent, or Firm*—William G. Rhines

[57] ABSTRACT

Embodiments of this invention include methods and apparatus for the production of flour from which products such as corn tortillas, tortilla chips, "taco shells", and the like, may be produced, in a continuous process, by pre-cooking the grain, stabilizing its moisture content, milling it to particulate form for suspension in a super-heated stream of air, replacing the ambient air with air which has lower moisture content and is cooler, and segregating out the flour-size particles from larger particles which are further processed into flour.

2 Claims, 2 Drawing Figures

CONTINUOUS PRODUCTION OF CORN PRODUCTS

This is a continuation of co-pending application Ser. No. 332,307 now abandoned filed Dec. 18, 1981, which is a divisional application of application Ser. No. 022,788, now U.S. Pat. No. 4,326,455 issued Apr. 27, 1982 filed Mar. 22, 1979.

BACKGROUND OF INVENTION

In the production of certain products, such as tortillas, tortilla chips, "tacos" shells, and the like, from grains such as corn, it is known that the basic grain material must be partially cooked before it is formed into the end product, so as to cause it to be partially gelatinized, reduced in particle size, and sufficiently nixtamalized. By "nixtamalized" is meant breaking the corn grain hull down toward a gelatinized state by cooking in lime-water. In the past, this has been done by processes where the grain is cooked in a lime-water solution, in a batch process such as that disclosed in U.S. Pat. No. 2,584,893 or in a continuous process such as that disclosed in U.S. Pat. No. 3,194,664, or in a semi-continuous process such as that disclosed in U.S. Pat. No. 2,704,257, and subsequently ground and dried to produce flour from which such corn products may be made.

It is desired to produce such flour-like material so that the home owner, small merchant, or other user may make up relatively smaller quantities of desired end products. Further, it is desired to produce such flour-like material by a continous, rather than a batch process, in the interests of realizing production efficiencies and cost savings, as well as economies of space. In addition, it is desired to produce a higher quality product than has been possible in the past.

Accordingly, an object of this invention is to produce material for the production of end products from grains such as corn.

Another object is to achieve this objective in the form of a flour-like material.

Yet another objective is to achieve these objectives utilizing a continuous process.

Still another objective is to attain these objectives in a way which is efficient and comparatively less expensive.

Another objective is to achieve these objectives and to produce flour-like products which are relatively uniform and homogeneous in their physical properties.

SUMMARY OF INVENTION

Desired objectives may be achieved through practice of the present invention, embodiments of which comprise continuous process methods and apparatus for pre-cooking corn, stabilizing its moisture content, milling it to an air-suspendable condition, entraining it in a stream of super-heated air, and separating and recovering the fine particles so produced from the coarse particles while the latter are further processed to render from them additional fine-particle material, including novel milling apparatus by means of which, milled particles may be introduced directly into the center of the super-heated air stream in a less pre-cooked condition for rapid and uniform cooking without significant sticking or burning.

DESCRIPTION OF DRAWINGS

This invention may be understood from the description which follows and from the appended drawings in which.

DESCRIPTION OF PREFERRED EMBODIMENTS

Figure 1:
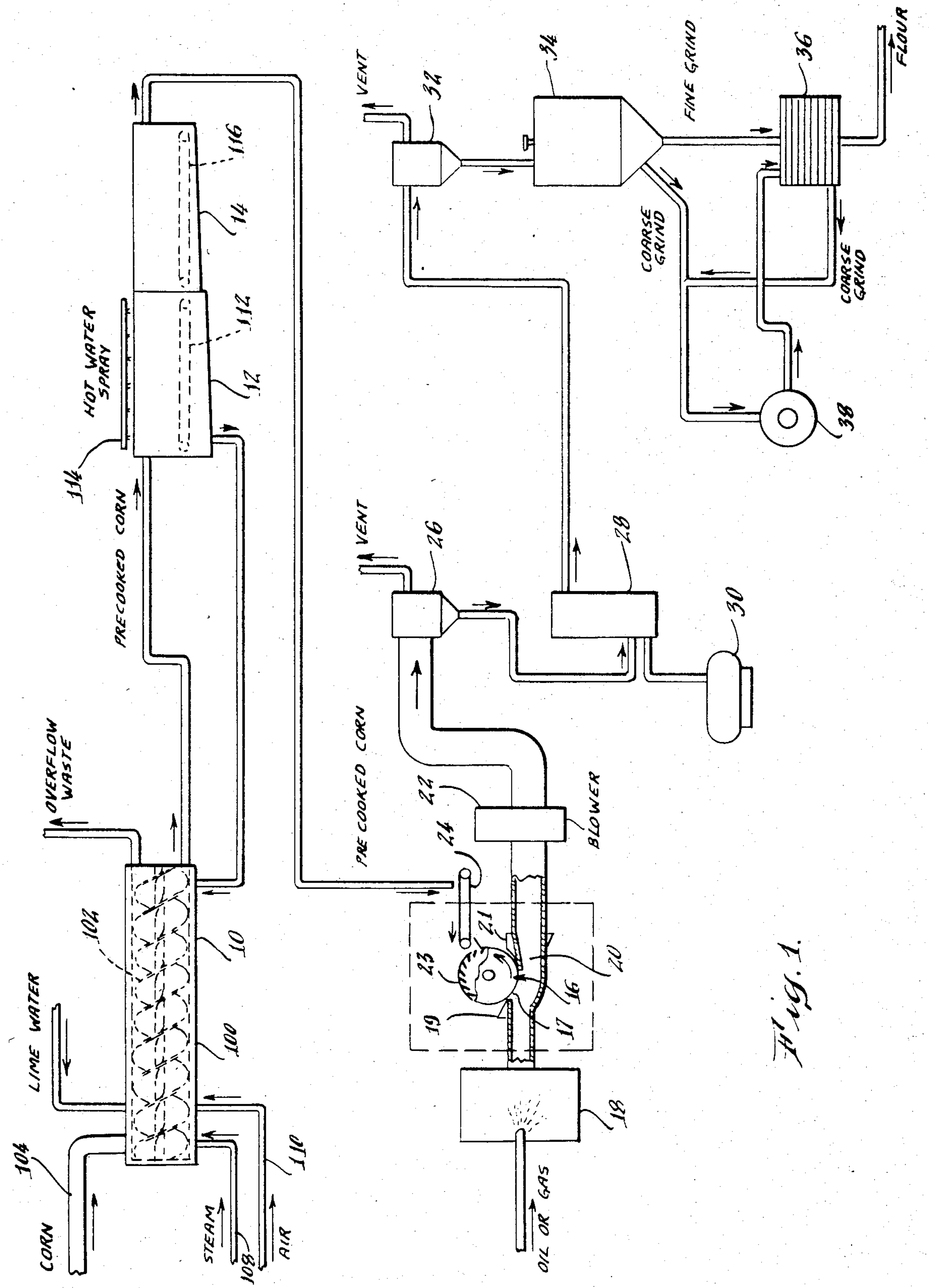
FIG. 1 depicts an embodiment of this invention.

Referring first to FIG. 1, there is depicted, in flow diagram form, an embodiment of the present invention. It includes a pre-cooker 10; a washer 12; a pre-conditioner 14; a primary mill 16 with an associated furnace 18, venturi 20, blower 22, and feeder bolt 24; a first cyclone separator 26; a cooler 28 with an associated blower 30; a second cyclone separator 32; an air-classifier 34; a segrogator 36; and a secondary mill 38.

The pre-cooker 10 is a steam heated, cylindrical chamber 100 in which is positioned a scew conveyor 102, typically having four "flutes" of helices per revolution with a diameter ratio of 4 to 1 and a volumetric efficiency of about 55%. Into the pre-cooker, corn and lime water are fed through pipes 104, 106, to form an aqueous suspension which may be heated by steam and serated through other pipes 108, 110 respectively. By regulating the amount of heat introduced via the steam, in coordination with the screw speed, it is possible to achieve the desired cooking cycle of 94° to 86° C. for 20–30 minutes. This permits nixtamal to be produced at moisture contents of between 35 and 37%, compared to the 46 to 51% previously used in the industry, while the pH is raised to about 11.5 with the addition of calcium hydroxide. Water loss in the process is replaced with wash water from the washer 12, which is regulated to keep the solid content of the cooker solution of about 3%. By use of this pre-cooker, a very uniform and constant set of conditions may be maintained, at relatively low moisture content, permitting the production of more homogeneous products while realizing components of as much as 50–75% in water having (with correspondingly reduced adverse environmental effects), 50% in heat, and 65% in lime; compared to the previously used batch processes. There are also realized better quality control of the product and space and labor efficiencies.

The now partially spaced cooked corn is then passed to a washer where, while ample drainage is provided, for example by an endless mesh belt 112, the corn is subjected to water at a temperature of about 90° C. through nozzles 114, to wash off excess lime-water and to impart heat to the corn for subsequent further processing.

The corn is then passed to the pre-conditioner 14 where a layer of corn, typically 35–50 cm. thick, is deposited on an endless belt 116 by which the corn may be subjected to a transmit time through the unit of 35–60 minutes, to cause the residual moisture content of between 2 and 3% from between the corn kernels to be re-absorbed by the corn. Unlike the prior art processes, this enhances the mechanical grinding processes which are to follow, and further aids in making the end product more uniform, because there is no soft outer surface of the kernels to foul the milling surfaces and the moisture content of the kernels cross-sectionally is more nearly uniform. It occurs because, instead of centrifuging off the intersticial water as in the past, the heat imparted to the grain by the hot water sprayed through the nozzles 114 makes it possible for the grain to reabsorb the interstitial water. The curtain treated may then be passed to a primary mill 16 by means of a bell feed 24.

Figure 2:
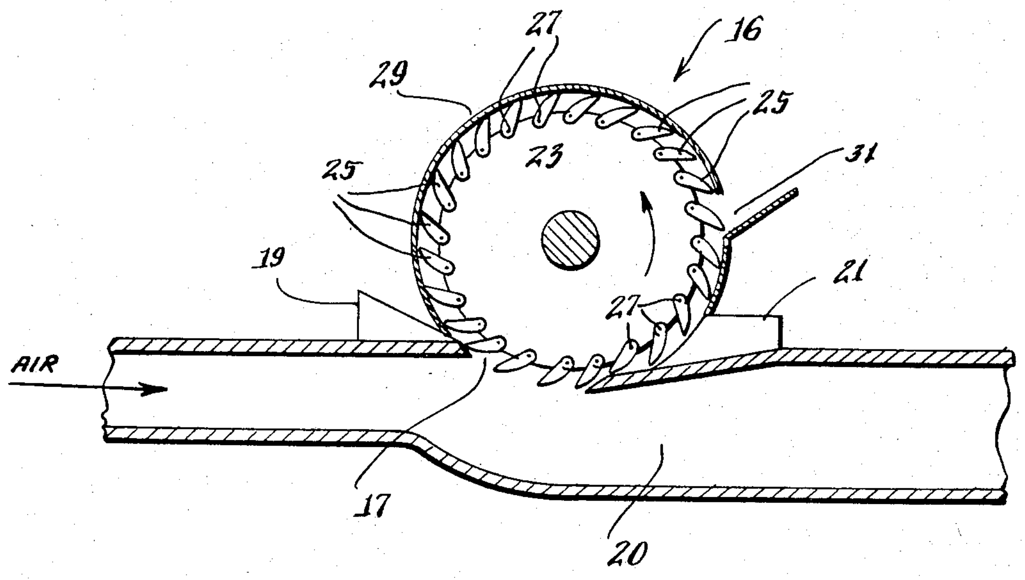
FIG. 2 illustrates a hammer mill useful in carrying out the present invention.

The mill 16, as illustrated with greater particularity in FIG. 2 than is shown in FIG. 1, is of different design than that of the usual grain hammer-mill. Like other such hammer-mills, it has a central, drum-like wheel 23 to the cylindrical outer face of which "hammers" 25, in the form of strips of metal, are pivotally affixed by means of pintles 27. The mill has an associated outer shroud 29, with a feed aperture 31 through which grain may be fed into the mill. In operation, the wheel 23 turns at a relatively high speed, causing the hammers 25 to be swung outward by centrifugal force, so that the outer ends of the hammers 25 impinge against the inside of the shroud 29, thereby performing a milling operation on the grain which has been introduced into the mill through the aperture 31. This mill, however, is different from prior art mills as follows.

The mill 16 is without the grid or plate that is usually positioned at the opening 17 between the lip flanges 19, 21, and the milling wheel 23 is made to turn in the direction of the arrow shown on FIGS. 1 and 2; which is opposite the direction in which the milling roll in such machines usually turns, so that in this mill, the particles are injected in the same direction as the air stream is moving rather than against it.

The hammer mill 16 has an associated specially designed venturi 20 into which the milled corn and hot air coming from a furnace 18 are introduced and impelled by means of a blower 22. Thus, the mill 16 is made so that the milled corn is discharged directly into the throat of the venturi, as a suspension of fine particles in air at a temperature of 550°-650° C., which is traveling at at least 30 meters per minute. By this means, the corn is reduced to a moisture content of 16-18%, and is partially gelatinized or cooked in a few seconds to an extent that would require as much as 2 hours in the cooking processes previously used, and utilizing considerably less space. In addition, since the milled corn is introduced as fine particles into the center of the air stream, it is cooked rapidly and uniformly, and without significant contact with the wall of the venturi due to the presence of the intervening layer of air, with consequent reduction in burning of the corn and sticking to the walls of the venturi because of contact with the hot metal walls. By virtue of this apparatus and method, it is possible to achieve economies in heat utilization, faster and better cooking, better control of particles, and savings in space for the drying operations.

Moisture laden air is extracted at the first cyclone separator 26 so that further moisture extraction may take place by impelling the corn through a cooler 28 with air introduced by the blower 30, thus further reducing the moisture content from 16-18% to 9-12%; the final desired humidity within this range being dependent upon the desired shelf-life of the end product. After further removal of moisture-laden air in the second cyclone separator 32, the further cooked product is admitted into an air-classifier of know per-se design, where coarser particles are separated from fine particles; the latter being directed to the segregator 36 where, for example using vibrating sieve screens of 35-60 mesh, the finest material is permitted to be discharged as flour. The coarse particles from the air-classifier 34 and those from the segregator 36 may be further milled in secondary mill 38, the product of which is again introduced into the segregator 36, all as shown in FIG. 1.

From the foregoing, it will be apparent that it is possible to produce flour-like material, made from grain such as corn, by a continuous process which utilizes relatively small space and is highly efficient in its utilization of energy and ancillary products; the end products being remarkably uniform in quality and having desirable handling and shelf-life characteristics. In addition, the flour produced is more hygroscopic, making it more susceptible to being rendered into dough.

It is to be understood that the embodiments herein described and shown, are by way of illustration and not limitation, and that other embodiments may be made without departing from the spirit of scope of this invention.

I claim:

1. A method for continuously making grain flour from corn kernels comprising the continuous and successive steps of exposing said corn to a lime water solution to form an aqueous suspension and steeping the aqueous suspension under controlled conditions of heat at 86° to 94° C., for a time of 20-30 minutes and at an alkalinity of about 11.5, passing the corn to a washer and washing the corn with water which is at a temperature of about 90° C. to remove any excess of lime-water from the corn and to impart heat to the corn for subsequent further processing, passing the corn to a preconditioner wherein the corn is deposited on a conveyor and subjected to a transmit time through the preconditioner of at least about 35 minutes, the thickness of the layer and the time of transit being sufficient to cause the residual moisture constant of between 2% to 3% from between the corn kernels to be reabsorbed by the corn and to render the distribution of water within the corn kernels more nearly uniform cross-sectionally, milling said corn into air-suspendable particles, introducing said particles into a stream of superheated air at a temperature of 550° C. to 650° C. and for a time which is sufficient partially gelatinize and cook the particles and is sufficient to reduce the moisture content of the particles to 16% to 18% cooling said particles while removing moisture therefrom to a content of about 9% to 12%, segregating said particles into groups according to size, and collecting substantially all those among said particles which are of less than a predetermined size.

2. The method described in claim 1 wherein said step of introducing said particles into said stream of super heated air includes the step of causing said particles to be carried into said stream by means of the roll of a hammer mill which normally moves in the direction of movement of said stream of air in the region where said stream impinges upon said roll.

* * * * *